Jan. 2, 1940. G. F. BRISENDINE 2,185,721
MANIFOLD UNIT AND METHOD OF PRODUCING THE SAME
Filed April 25, 1938 2 Sheets-Sheet 1

INVENTOR.
Guy F. Brisendine
BY
ATTORNEYS

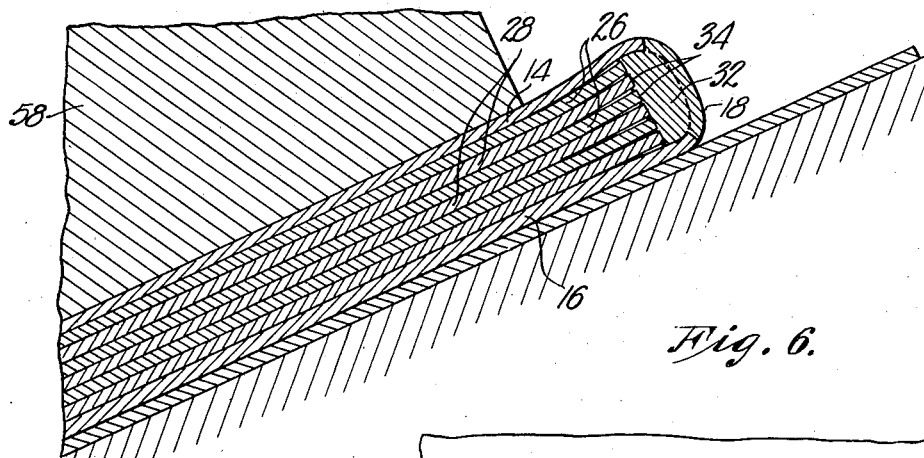
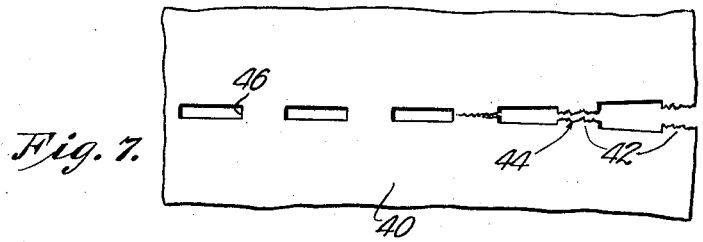
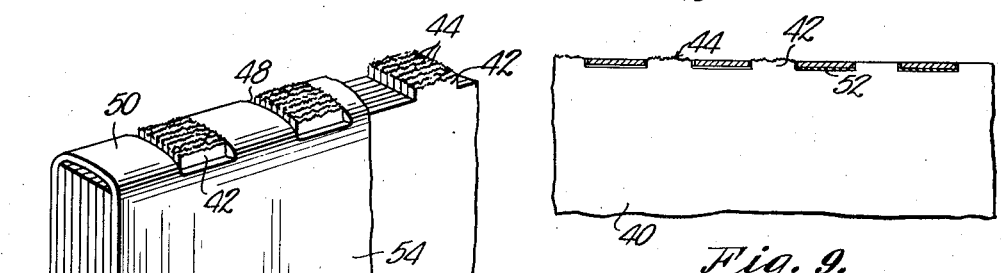
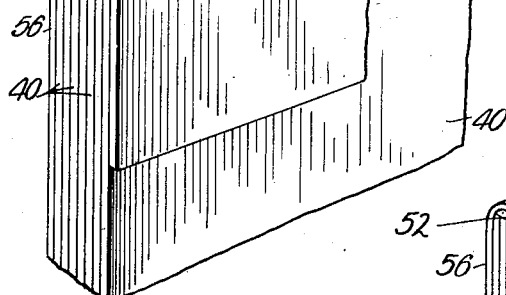
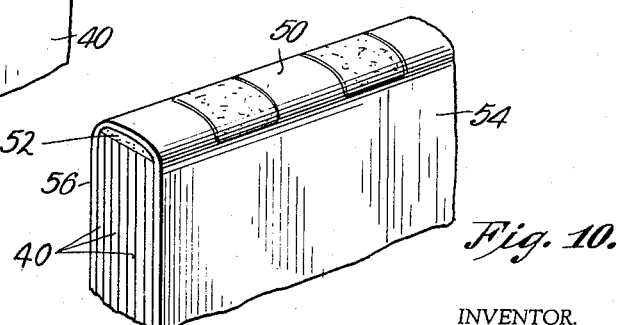

Patented Jan. 2, 1940

2,185,721

UNITED STATES PATENT OFFICE 2,185,721

MANIFOLD UNIT AND METHOD OF PRODUCING THE SAME

Guy F. Brisendine, Kansas City, Mo., assignor to Carbon Systems, Inc., Kansas City, Mo., a corporation of Missouri Application April 25, 1938, Serial No. 204,159

9 Claims. (Cl. 281—21)

This invention relates to the art of manifolding and particularly a manifold unit having unique characteristics and the method of manufacturing the said unit.

One of the primary objects of the invention is to provide a manifold unit that is held in assembled relation in a manner which permits the use of additional insert sheets of a size and character as those from which the unit is made.

A still further object of the invention is to provide a manifold unit with means for releasably securing together the jacket and insert sheets thereof which does not occupy and thereby waste any portion of the said insert sheets, yet which is adequate to maintain the unit assembled during normal handling and prior to the time when the operator desires to separate the component parts thereof.

A yet further and more specific object of the invention is the provision of a manifold unit of the aforementioned general character that has novelly inter-related insert sheets and U-shaped jacket which are releasably held together in such fashion as to permit ease in manipulation yet afford a sufficient amount of cohesion as to preclude accidental displacement of the component parts of the unit until the operator desires to quickly disassemble the same.

Another aim of this invention is to provide a method of producing manifold units, which method relates particularly to the application of an adhesive to the manifold unit and the manner of supporting said unit during the application of the adhesive, all to the end that certain interstices uniquely created at the time in the unit, are filled with adhesive through capillary action and through the action of gravity.

Because of the specific nature of the manifold unit parts which embody the important concepts of this invention, a large number of minor objects of a valuable nature will appear during the course of the following specification, referring to the accompanying drawings wherein:

Fig. 6 is a greatly enlarged fragmentary detailed sectional view through folded marginal edge of the manifold unit illustrating the flared condition of the component parts during the time of applying the adhesive.

Fig. 7 is a fragmentary face view of a portion of an insert sheet illustrating the manner of tearing the same to produce the ears on one edge thereof.

Fig. 8 is an enlarged fragmentary perspective view of a portion of a manifold unit prior to applying the adhesive.

Fig. 9 is a fragmentary longitudinal sectional view through the unit illustrated in Fig. 8; and, Fig. 10 is a fragmentary perspective view showing a portion of the folded edge of a manifold unit in the finished condition.

Heretofore, manifold units have been constructed so that a substantial portion of the insert sheets have been covered and rendered useless by the adhesive used in securing together the insert sheets and for maintaining the said sheets in the folded jacket. In some instances, efforts have been expended to satisfactorily hold the insert sheets in the operative position by means other than an adhesive which covered a part of the sheet surface. The problem presented and which this invention intends to overcome, is the inadequacy of the means for securing together the component parts of a manifold unit. It is necessary to provide sufficient strength in the unit for holding the parts together during handling, but the securing means must be of such a nature as to allow quick release when the operator desires such quality.

Figure 1:
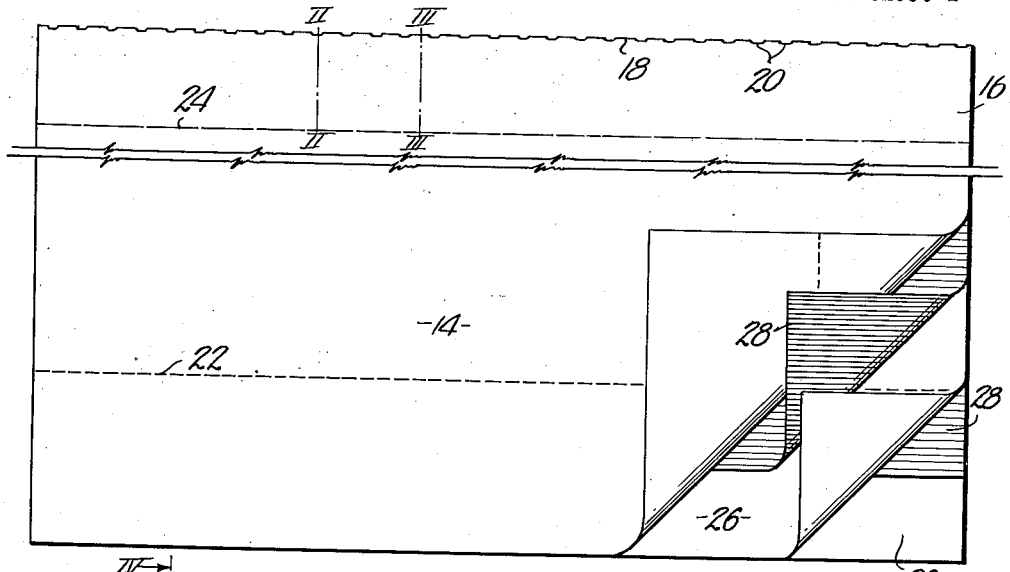
Figure 1 is a condensed plane view of a manifold unit made in accordance with the present invention.

A manifold unit which has been found satisfactory and that embodies the present invention is illustrated in Fig. 1. This manifold unit comprises a jacket of sheet material, generally designated by the numeral 12, and which is U-shaped in transverse cross section so that a pair of legs 14 and 16 are presented. An arcuate bight 18 interconnects legs 14 and 16 and this portion of the jacket 12 might be considered a line of fold along which is formed a number of openings 20. In practicing this invention, openings 20 must be larger than has normally been employed in this art for the purpose of merely presenting lines of tear and the distance between the openings must be great enough so as to present a tubular cavity having the characteristics as will more fully be hereinafter set down.

Jacket 12 may have legs 14 and 16 thereof of any suitable length and in the case illustrated, leg 16 is relatively short and therefore presents what is commonly known as a "semi-jacket".

The manifold units which embody this invention are usually printed to form invoices, statements and other business forms, but since such material forms no part of this invention, the same has not been illustrated in the accompanying drawings. Two lines of slits 22 and 24 are however, shown but do not contribute to the novelty of the unit in any way.

Openings 20 are preferably formed while jacket 12 is in a flat condition with legs 14 and 16 in the same plane. After openings 20 are formed, jacket 12 is folded and then the desired number of insert sheets 26 are gathered and moved to position. Sheets of carbon paper 28 are oftentimes made a part of the unit so that when making entries upon leg 14 of the jacket, the desired number of copies will be transferred to insert sheets 26.

Figure 2:
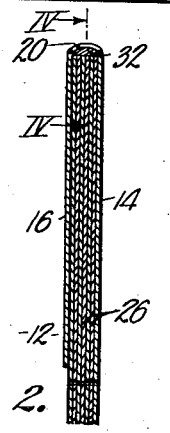
Fig. 2 is an enlarged fragmentary cross sectional view through the unit taken on line II—II of Fig. 1.
Figure 3:
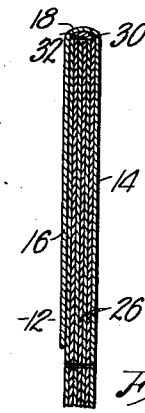
Fig. 3 is a similar cross sectional detailed view taken on line III—III of Fig. 1.
Figure 4:
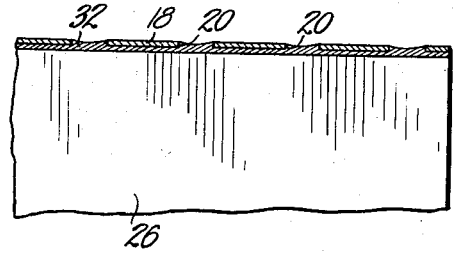
Fig. 4 is a fragmentary longitudinal sectional view taken along line IV—IV of Fig. 2.
Figure 5:
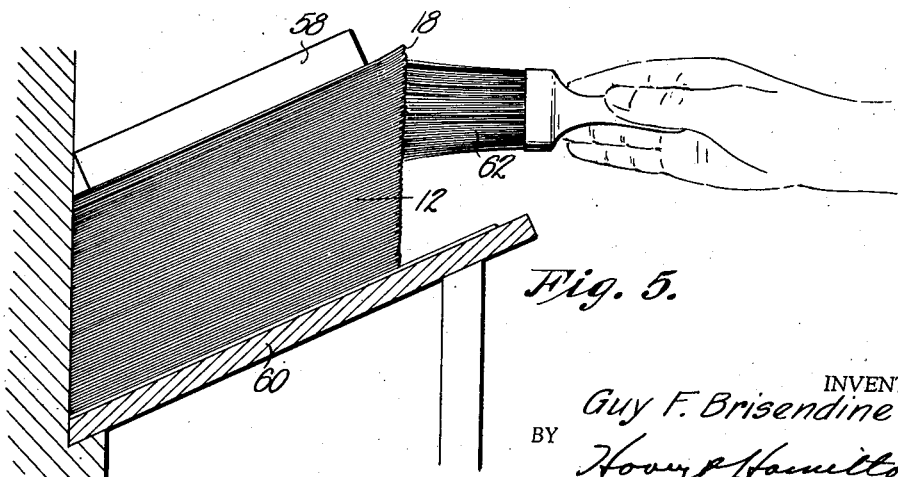
Fig. 5 is a view illustrating the manner of stacking the manifold units during the application of the adhesive.

Insert sheets 26 and carbon sheets 28 are in superimposed relation and one edge thereof is in spaced relation to the inner surface of bight 18. These inner edges, bight 18 and portions of legs 14 and 16 combine to present a tubular cavity 30 with which each hole 20 is in communication. This tubular cavity 30 has a filling of adhesive material 32 therein and when the hereinafter described method is complete, the adhesive material extends outwardly into openings 20 to further insure that the insert sheets and jacket are held together. Openings 20 are substantially as wide as bight 18 so as to expose to the adhesive 32 a portion of the edges of all the insert sheets 26, as shown in Fig. 2.

In this regard, attention is drawn to the fact that adhesive 32 does not cover any noticeable part of the faces of either insert sheets 26 or carbon sheets 28. The gripping action is confined in the main to the edges of these said sheets 26 and 28 which are shown at 34 in Fig. 6.

The filling of adhesive material 32 therefore becomes a flexible longitudinally extending element to which the edges 34 of inserts 26 and 28 are fastened and to which the inner face of bight 18 is secured.

A slightly modified structure is illustrated in Figs. 7 to 10 inclusive. The difference between the manifold unit shown in these figures and that just described merely lies in the insert sheets 40 all of which are provided with ears 42 extending outwardly from one edge thereof and created as shown in Fig. 7. These ears are preferably made to present a frayed outer edge 44 and the manner of producing these ears consists in forming a plurality of aligned openings 46 very close to the edge of sheet 40 and then tearing away the marginal portion of the sheet between the line of openings and its edge. A number of ears 42 will thus be created.

The openings 48 formed through the bight 50 of the jacket of the modified form of unit, must be complementary to the series of ears 42 so that when insert sheets 40 are moved to position within the jacket, these ears 42 will extend outwardly through the openings 48 as shown in Figs. 8 and 9. A number of insert sheets are always used in manifold units employed for business forms and in many instances 8 or 10 inserts are necessary. A large number of such inserts 40 are shown in Fig. 8 and the ears 42 thereof are superimposed so that the outer edges 44 thereof will present a frayed area of a size equal to the combined edges of all ears 42 extending through openings 48.

The parts of a manifold unit are usually made of paper and when an edge such as 44 is created, fibers are present that are of a length great enough to overhang adjacent filler sheets 40 when a smoothing action occurs.

Adhesive 52 is flowed into the spaces afforded by bight 50, edges of filler sheets 40 between ears 42 and portions of legs 54 and 56 of the jacket. The width of ears 42 should be slightly less than the length of openings 48 so that the adhesive 52 may extend upwardly along the edges of ears 42 and edges of bight 50 formed by openings 48. This feature is illustrated in Fig. 9 and Fig. 10 indicates the manner in which the frayed area is smoothed by the application of adhesive material when the unit is completed. Such smoothing bends the fibers of the frayed edges 44 laterally over adjacent ears and a very definite bonding occurs.

The method of applying the adhesive material to either form of manifold unit is the same. This method comprises stacking the assembled jackets and inserts on an inclined support with the folded edges or bights of the jackets in a vertical plane. The units are inclined rearwardly and downwardly and pressure is applied to the stack of units in any suitable manner so long as the area of pressure starts along a line parallel to and spaced inwardly from the folded edges of the units. In so applying the pressure it has been found that the marginal edges of jackets 12 along the bight thereof, will flare slightly and cause the insert sheets 26 and 28 to slightly part to a minute degree as shown in Fig. 6. The distance between the adjacent filler sheets however, is not great enough to permit the adhesive material to flow far across the faces of the inserts but a microscopic examination indicates that adhesive 32 covers a very narrow marginal edge of filler sheets 26 and 28 as illustrated in Fig. 6.

In the instance shown, the pressure element 58 is merely a weight or block and the support is a table having an inclined top 60.

It has been found satisfactory to use an ordinary brush 62 as an applicator for the adhesive material which may be any suitable flexible glue or the like, thin enough to freely flow into the tubular cavity hereinabove described. Excess adhesive material must be wiped from the stack of units with a suitable solvent of the adhesive before the latter sets.

Openings 20 or 48 as the case may be are large enough to receive an adequate amount of adhesive material and when the units are stacked as shown and described, the action of gravity upon the adhesive material insures that it will flow through the openings and into the tubular cavity until it strikes the edges of the inserts. The length of the tubular cavity between openings 20 is great enough to establish capillary action so that the adhesive material is drawn into the cavity to completely fill the same.

When a manifold unit has been made in accordance with the foregoing description as to method and structure, the same may be "fanned" and handled without danger of the parts becoming separated, and if an operator desires to use another sheet between the ones forming the unit, it may be introduced to a position where one edge thereof is, for all practical purposes, in register with the bound edges of insert sheets 26 or 40 as the case may be. This advantage is gained because no area of the insert sheets is covered by the adhesive which is used to bind the same together and in place.

To produce best results it is desirable to form openings 20 and 48 by a special wheel or tool that cuts an elongated hole of much greater length than its width. The distance between openings 20 should be at least twice the length of the openings so as to establish the action desired, and the width of the holes very nearly approaches the width of the bight wherein they are formed. The width of openings 20 and 48 should be great enough to expose the edges of all insert and carbon sheets held in the jacket.

Manifestly, insert sheets of various types and sizes may be employed and a greater or lesser number than that illustrated be used without affecting the invention.

It is understood that many changes and modifications might be made other than those illustrated and described and therefore, it is desired to be limited only by the spirit of the invention and the scope of the appended claims.

Having thus described the invention, what is claimed as new and desired to be secured by Letters Patent is:

1. A manifold unit of the character described comprising a jacket of sheet material, U-shaped in transverse cross section and presenting a pair of legs and a bight joining said legs along one edge of the unit; a plurality of superimposed insert sheets embraced by said jacket with one edge thereof in spaced relation to said bight of the unit to form, with the bight and portions of the legs, a tubular cavity; and a filling of adhesive material in said cavity to releasably retain together the insert sheets and said jacket, said insert sheets having a series of outwardly disposed ears along the edges thereof adjacent to the bight of the jacket, said series of ears being complementary to the series of openings and extending thereinto.

2. A manifold unit of the character described comprising a jacket of sheet material, U-shaped in transverse cross section and presenting a pair of legs and a bight joining said legs along one edge of the unit; a plurality of superimposed insert sheets embraced by said jacket with one edge thereof in spaced relation to said bight of the unit to form, with the bight and portions of the legs, a tubular cavity; and a filling of adhesive material in said cavity to releasably retain together the insert sheets and said jacket, said insert sheets having a series of outwardly disposed ears along the edges thereof adjacent to the bight of the jacket, said series of ears being complementary to the series of openings and extending thereinto whereby the tubular cavity is divided into a number of relatively short lengths, the filling of adhesive material in each of said lengths being extended outwardly between the ends of said ears and the edges of the bight formed by adjacent openings.

3. A manifold unit of the character described comprising a jacket of sheet material, U-shaped in transverse cross section and presenting a pair of legs and a bight joining said legs along one edge of the unit; a plurality of superimposed insert sheets embraced by said jacket with one edge thereof in spaced relation to said bight of the unit to form, with the bight and portions of the legs, a tubular cavity; and a filling of adhesive material in said cavity to releasably retain together the insert sheets and said jacket, said insert sheets having a series of outwardly disposed ears along the edges thereof adjacent to the bight of the jacket, said series of ears being complementary to the series of openings and extending thereinto, the outer edges of said ears being roughened to present a frayed area formed by the combined edges of all the ears extending through any one of the openings for the purpose specified.

4. A manifold unit of the character described comprising a jacket of sheet material, U-shaped in transverse cross section and presenting a pair of legs and a bight joining said legs along one edge of the unit; a plurality of superimposed insert sheets embraced by said jacket with one edge thereof in spaced relation to said bight of the unit to form, with the bight and portions of the legs, a tubular cavity; and a filling of adhesive material in said cavity to releasably retain together the insert sheets and said jacket, said insert sheets having a series of outwardly disposed ears along the edges thereof adjacent to the bight of the jacket, said series of ears being complementary to the series of openings and extending thereinto, the outer edges of said ears being roughened to present a frayed area formed by the combined edges of all the ears extending through any one of the openings for the purpose specified, the frayed area of said edges of all the ears extending through any one of the openings having adhesive material thereon to smooth the said area and hold portions of certain of the ears against some of the remaining ears.

5. A method of producing a manifold unit comprising forming a series of aligned openings through a sheet of material; folding the sheet along the line of openings to form a U-shaped jacket; placing a plurality of insert sheets within the jacket with one edge thereof in spaced relation to the line of fold; stacking a number of units so assembled upon an inclined support with the folded edges thereof in a vertical plane and higher than the respective opposite edges of the units; and applying freely flowing adhesive to the folded edges to allow the same to flow inwardly and downwardly through said openings to fill the spaces between the edges of the insert sheets and the fold of the jacket.

6. A method of producing a manifold unit comprising forming a series of aligned openings through a sheet of material; folding the sheet along the line of openings to form a U-shaped jacket; placing a plurality of insert sheets within the jacket with one edge thereof in spaced relation to the line of fold; stacking a number of the units so assembled upon an inclined support with the folded edges thereof in a vertical plane and higher than the respective opposite edges of the units; compressing the stack of units along a line inwardly from the folded edges to slightly flare the insert sheets and sides of the jacket; and applying freely flowing adhesive to the folded edges to allow the same to flow inwardly and downwardly through said openings to fill the spaces between the insert sheets and the folded edges of the jackets.

7. A manifold unit of the character described comprising a jacket of sheet material, U-shaped in transverse cross section and presenting a pair of legs and a bight joining said legs along one edge of the unit; a filler consisting of a plurality of superimposed, flat insert sheets embraced by said jacket with one edge thereof in spaced relation to said bight of the unit to form, with the bight and portions of the legs along their lines of connection with the bight, a tubular cavity;

and a filling of adhesive material in said tubular cavity to releasably retain together the sheets of the filler and said jacket, said U-shaped jacket being provided with a plurality of spaced apart openings through the bight thereof in communication with the said tubular cavity, each of said openings being substantially the same width as the bight to expose the edges of the sheets of said filler, the distance between said openings being great enough with respect to the cross sectional area of the tubular cavity to cause capillary action on the adhesive material as the same is applied to the edges of the filler sheets through said openings whereby the tubular cavity is completely filled and the edges of the filler sheets are bound together and to the inner face of the bight between the openings.

8. A manifold unit of the character described comprising a jacket of sheet material, U-shaped in transverse cross section and presenting a pair of legs and a bight joining said legs along one edge of the unit; a filler consisting of a plurality of superimposed sheets embraced by said jacket with one edge thereof in spaced relation to said bight of the unit to form therewith a tubular cavity; and a filler of adhesive material in said cavity to releasably retain together the insert sheets and said jacket, said insert sheets being slightly spaced apart at the edges thereof adjacent to said bight, said adhesive having a portion thereof between the edges of said sheets to overlie narrow marginal edges thereof.

9. A manifold unit of the character described comprising a jacket of sheet material, U-shaped in transverse cross section and presenting a pair of legs and a bight joining said legs along one edge of the unit; a filler consisting of a plurality of superimposed sheets embraced by said jacket with one edge thereof in spaced relation to said bight of the unit to form therewith a tubular cavity; and a filler of adhesive material in said cavity to releasably retain together the insert sheets and said jacket, said sheets of the filler and the legs of the jacket being flared adjacent to the bight, said adhesive having portions thereof between proximal faces of the legs of the jacket and said filler sheets.

GUY F. BRISENDINE.